018 # United States Patent Office 2,702,787
Patented Feb. 22, 1955

2,702,787
DRILLING FLUID
John Wilbur Freeland, Fullerton, Calif.

No Drawing. Application August 22, 1950,
Serial No. 180,899

8 Claims. (Cl. 252—8.5)

This invention relates to a drilling fluid of the type employable in the rotary drilling of oil and gas wells. It pertains also to the drilling of such wells with the compositions herein described.

In the process of earth boring with a rotary bit and drill stem, a compounded fluid made to predetermined physical and chemical properties is circulated to the bottom of the borehole thru the drill stem, thence out thru apertures in the cutting head at the bottom of the borehole and then back up the borehole to the surface by passage thru the space between the drill stem and the bore wall (or between the drill stem and casing where such has been put in place). The desired functions of such fluid include surface lubrication of the cutting teeth, removal of cuttings from the bottom of the borehole, and formation of a sealing film on the wall of the bore.

This flow of the circulating fluid is maintained by a pump located at the surface, and the upcoming fluid is generally then passed over a shaker screen to remove the cuttings before the fluid is returned to the well, after being fortified from time to time by incorporation of such additives as may have been lost by adhesion to cuttings or may be newly required due to making up additional volume as more footage is drilled in the hole.

In the past, such drilling fluids have been characterized as water-base fluids (containing for example, clay, water and weighting material) or oil base fluids (such as those compounded of diesel oil, blown asphalt, and weighting material). In either case the fluid contained suspended material to give it body or weight. Each type of fluid was particularly adapted for use under certain operating conditions but neither was universally satisfactory; and especially under such intermittently occurring drilling conditions as the influx of brine, the presence of low pressure formations, intervention of calcareous strata, etc. their defects become increasingly evident. Among such shortcomings may be mentioned fluid loss into low pressure zones, flocculation of the drilling fluid by contact with bentonitic shales or with cement (from plugs and the setting of liners or casing), undesirable increase of viscosity as a result of incorporation of various additives to the fluid in an effort to overcome water loss, and increase of hydrostatic head due to dispersing of bentonitic shales by such added chemicals.

Accordingly it is an object of the present invention to provide an improved compounded drilling fluid which is neither an oil base or a water base mud but may be characterized as a water in oil emulsion. Primarily such a drilling fluid is free of suspended particles, hence is not a "mud" at all, but carries in permanent and intimate incorporation therein, both oil-soluble and water-soluble constituents. However if a heavy or weighted drilling fluid is required to counteract formation pressure, when drilling into unforeseen gas caps, it may be obtained by adding the usual inert weighting agents to my fluid such as powdered limestone, oyster shells, barytes, iron oxides, hematite, limonite, or other water insoluble heavy mineral. However, such additives do not have to be free of water insoluble materials.

Another purpose of the invention is to provide a drilling emulsion which is stable even under elevated temperature and pressure and can be repeatedly recirculated in a borehole after screening or settling to remove the cuttings carried up from the borehole. Such separation does not take out the compounding ingredients of my fluid since they are dissolved in one phase or the other or a stable emulsion.

A further object is to provide a drilling fluid of comparatively light weight and low viscosity which is particularly adapted for drilling low pressure wells with less danger of its fluid penetrating into oil or gas producing zones. In this connection, the provision of an oily drilling fluid which carries no chemicals capable of being precipitated or deposited is especially worthy of note, since in the past, the penetration of oil strata by water from the drilling mud as well as the deposit of chemicals in the formation have been recognized as causes of non-productivity of oil bearing strata, particularly in areas of low formation pressure. Likewise it is also recognized that when either the liquid phase or the solid content of the old type drilling muds were taken up in the strata, the characteristics of the circulating material in the borehole were inevitably drastically (and unfavorably) altered. In much the same way, the dissolution of an oil base mud by formation water, or the penetration of oil into a water base mud greatly decreases or destroys the effectiveness of the drilling mud. Now by the present invention, the chances of substantial loss or damage from such causes is greatly reduced or eliminated.

Yet another purpose is to provide a drilling fluid which does not greatly increase in weight or viscosity under such adverse conditions as contact with brine or lime bearing strata.

Still another object is to permit the drilling of cement plugs from oil and gas wells without flocculation of the chemicals of the drilling fluid by the cement.

A further purpose is to permit continuous drilling thru bentonitic shales without increasing the weight and viscosity of the drilling fluid thereby. By my present fluid, such shale is flocculated in the circulating fluid into rice and pea size or larger masses (depending on the size of the cuttings) which can be readily removed by the shaker screens and the clean fluid accordingly may be returned to the mud system and thence into the borehole. The use of my drilling fluid at the same time prevents the hydration of bentonite and its sloughing into the borehole so as to stick the bit, as has been experienced with prior drilling fluids. This results likewise in the production of straighter boreholes.

Expressed in another way, a purpose of my invention is to provide a drilling fluid which does not require constant adjustment of additives in order to correspond to varying strata being drilled. Thus chemicals which depend upon closely regulated or critical solvent properties to prevent their precipitation and plugging of formations may be completely eliminated from the drilling fluid.

Yet another object is to provide a drilling fluid which upon being passed thru standard screening or settling devices can be recirculated to a well. Such a fluid on filtering against a formation yields a clean oil filtrate of low surface tension capable of being readily flushed from producing formation when the well is brought in. Thus in a filter bomb test at 100 p. s. i. with my fluid the emulsion was reduced to a filtrate of clear oil of low surface tension.

Still other purposes of the invention include the provision of means for utilizing the alkali metal salts of carboxy methyl cellulose in a stable non-clayey and non-aqueous drilling emulsion and which emulsion may be advantageously employed in brine, bentonite, limestone, and gypsum strata without deterioration of the fluid. The term "non-aqueous" is used in this connection to contrast with the conventional water base drilling mud, which is designated as an aqueous drilling fluid in the nomenclature of the art.

A further object is to provide such a drilling fluid which after incorporation of mud through use can be thinned with water and oil to produce a reusable drilling fluid without the addition of further chemicals and without substantial impairment of its original properties.

Other objects and advantages of the invention will become apparent as the description proceeds.

In preparing my water-in-oil emulsion for drilling, I prefer to use a comparatively light weight mineral oil such as commercially obtainable gas oil or diesel fuel oil. Such hydrocarbon base need not be highly refined and need not be derived entirely from petroleum, but at current prices these two fractions (or mixtures thereof in any proportions) are most convenient to use for my drilling fluid. In general such oil which will constitute from about 40 to 95% volume of the drilling fluid should be about 28 to 40 gravity. However, heavier or more viscous oil (e. g. down to about 20 gr.) can also be used, but the particular advantage of the lighter fractions is the low viscosity and light weight which they contribute to the drilling fluid. When drilling thru formations containing water, my fluid can be made up with little or no water. It then takes up formation water into the emulsion during use.

An oily or oil soluble emulsifying agent is used with the mineral oil. The whole class of known oil soluble emulsifying agents can be used. Particularly applicable are the alkaline earth metal (calcium, magnesium, barium and strontium) salts of saponifiable oils such as vegetable oils, wood oils, and fish oils. The "foots" or still bottoms of all these are especially applicable. Mixtures of all of these classes can likewise be used. Vegetable oils may be exemplified by maize oil, soya oil, cottonseed oil, etc. Typical cottonseed foots which I use, for instance, may have a neutral oil content of 19%, fatty acids 24%, and non-fatty substance 8%. The blown or oxidized foots from vegetable oil refining are also quite applicable. I can also use the materials known in the paper industry as the "dresinates," the sodium and potassium salts of a series of prepared rosins (Zimmerman and Lavine, Handbook of Material Trade Names, 1948, page 142). Sodium dresinate is commercially available and may be converted to oil-soluble calcium dresinate in the well known manner, by double decomposition with a calcium salt.

Wood oils may be exemplified by rosin oil, tall oil and tall oil pitch. This last is a mixture of (45 to 60%) fatty acids and (35 to 50%) rosin acids (calculated as abietic acid), the mixture having an acid number of 160 to 180, a saponification number of 165 to 185, a rosin acid number of 63 to 90, and an iodine number of 140 to 150 (Wijs). Viscosity may be on the order of 50 to 120 SUS at 210° F. These physical and chemical properties correspond in general to preferred fractions of other oil soluble emulsifying agents or to their pre-saponified oily material. Tall oil pitch is commercially obtainable for example, under the name "tallene." Blown tall oil and tall oil pitch as well as blown rosin are also applicable.

Other applicable emulsifying agents include blown or oxidized asphalt and the alkali and alkaline earth salts of lignin.

While the dry soaps can be mixed into the oil base, I prefer to form the same in situ. Thus hydrated lime, tall oil or tall oil pitch and a light petroleum distillate are mixed together. Preferably an excess of alkaline earth hydroxide is used over that needed for reaction with the fatty acids and unsaponifiable material. In general about one-half pound lime is used for each pound of oily emulsifying agent. The excess lime aids in bringing up the pH of the emulsion and may also react with any free hydroxyl groups of the water soluble emulsifying agent.

In general, about 5 to 40 pounds of such emulsifying agents can be used per barrel of fluid although larger or smaller amounts can be incorporated in the fluid.

The aqueous phase of the emulsion is generally contributed by alkaline water, such alkalinity being conveniently furnished by the lime or other alkaline earth metal hydroxide employed to saponify the oily emulsifying component. Preferably the pH of the drilling fluid is maintained at about 10 to 14 because if the pH falls below the value of 10 dissociation of the calcium soap gives a rise in water loss and a lowering of viscosity. The higher the pH value the more stable. The water phase should be kept saturated with lime for greatest efficiency.

For the water soluble emulsifying agent I use an alkali salt (sodium, potassium or lithium) of carboxymethyl cellulose. The sodium salt is commercially obtainable, being known to the trade as CMC (or NaCMC). It is formed by reacting sodium cellulose with monochloroacetic acid. After reaction with the primary hydroxyl group of cellulose, further acetyl reaction may take place with one or both of the secondary hydroxyls to yield a glycollic ether so that the unpurified end product is a mixture of these three products. However, such mixtures (as well as the purified product) are quite usable in my drilling fluid. For example, such a commercial product "Grade 10–D" which contains 58% sodium carboxymethyl cellulose is commonly used in the textile and soap industry and has been found very satisfactory for my purpose. Since the viscosity of CMC mixtures varies with the amount of esterification, this must be taken into account in preparing an emulsion of desired viscosity. However CMC of any viscosity can be used as long as it is water soluble. In this connection it is again pointed out that the excess of lime or other alkaline earth hydroxide used with the oil soluble emulsifying agent, apparently reacts with the remaining hydroxyl groups of the CMC so as to stabilize the final emulsion.

In place of the alkali metal salt of carboxymethyl cellulose, I can use (in whole or part) a sodium salt of polyacrylic acid produced by the hydrolysis of polymerized acrylo nitrile. This may be obtained commercially under the name "Aeropan SR #1" from the American Cyanamid Co.

By way of example, such CMC is used in the following manner and proportions in preparing my drilling fluid:

1. Dissolve 1.25 gms. of grade 10–D CMC in 125 cc. water and set aside for future use.

2. Dissolve 15.0 gms. of tall oil in 210 cc. of gas oil or diesel fuel of about 24–32 gravity or preferably 28 gravity gas oil. (Crude oils can be used but I prefer refined oil.)

3. Disperse 7.5 gms. of hydrated lime in 15.0 cc. of water.

4. Vigorously agitate the gas oil-tall oil solution (I prefer a Waring Blender for mixing although other high speed shear type mixers will do), add the dispersion of lime and continue mixing one hour.

5. Now add the CMC solution to the product of #4 and continue mixing for another hour. The resulting fluid will have the approximate values:

| | |
|---|---|
| 30′ water loss_____cc__ | 0.0 |
| Marsh funnel vis_____secs__ | 60 |
| A. P. I. gel: 0 mins., 10 mins_____ | 0–0 |
| Weight, lbs. cu. ft_____ | 58.0 |
| pH _____ | 12.0–12.5 |

*Note.*—For larger quantities use the following equivalents: 1.0 gram equals 1 lb./bbl.; 350 cc. equals 1 (42 gal.) bbl.

The final fluid should have a maximum viscosity of about 100 seconds, API.

In general, I use about ½ to 7½ lbs. of CMC per barrel of fluid and about 5 to 40 lbs. per barrel of the oil soluble emulsifying agent, typified by the alkaline earth metal soaps. In this connection, it may be observed that the strontium, barium, and magnesium oxides or hydroxides saponify the fatty or rosin acids to form a soap similar to the calcium oxide or hydroxide. Likewise the water soluble potassium and lithium salts of CMC can be used similar to the sodium salt to provide the water-soluble emulsifying agent.

The preceding formula with 1½ lbs./bbl. CMC was used in the drilling of a well in the Upper Terminal Zone of Long Beach, California.

| Date | Depth | Water Loss, cc. 30' | Water Loss, cc. 60' | Vis., seconds | Gel. 0' | Gel. 10' | p. c. f. | Hydrion pH | Percent Sand | Percent Oil | Additions Water (bbl.) | Additions Lime (bbl.) | Additions Conc. (bbl.) |
|---|---|---|---|---|---|---|---|---|---|---|---|---|---|
| Start | 3,645 | | | | | | | | | | | | |
| 8-9-50 5:45 a. m. | 3,755 | 0 | 0.05 | 74 | 0 | 0 | 58.5 | 12.5 | 0 | | | 50 | |
| 8:00 a. m. | 3,813 | | | | | | | 12.5 | | | | 50 | |
| 9:30 a. m., Flow line 110° F. | 3,873 | 0 | 0.05 | 67 | | | 59.0 | 12.0 | 0.2 | | | | |
| 12:30 p. m. | 3,940 | 0 | 0.05 | 61 | | | 58.5 | 12.0 | 0.1 | | | | |
| 3:00 p. m., 114° F. | | | | | | | | 12.0 | | 59.9 | 1 | 100 | |
| Final depth of hole drilled with 7⅝" bit. Now a scraper was put on to open hole to 14". | | | | | | | | | | | | | |
| 8-10-50 12:45 a. m.¹ | 4,070 | 0 | 0 | 90 | | | 58.5 | 12.5 | | 57.2 | 10 | 450 | 10 |
| Logged well and repaired clutch from 8-10-50 to 7 a. m. 8-11-50; started to scrape 5:30 a. m. | | | | | | | | | | | | | |
| 8-11-50 7:00 a. m.² | | 0 | 0 | 64 | | | 60.0 | 12.5 | 0.5 | 55.3 | | | |
| 8-11-50 3:00 p. m. | 3,740 | 0 | 0 | 71 | | | 59.0 | 12.0 | | | | | |
| 8-12-50 1:00 a. m. | | | | 62 | | | 59.0 | 12.5 | | | 2 | 200 | |
| 4:15 a. m. | 3,822 | 0 | 0 | ⁴110-115 | | | 59.5 | 12.5 | | | 10 | 1,500 | 25 |
| 8-12-50 7:45 p. m. | 3,913 | | | 110 | | | 59.2 | 12.0 | Trace | | | | |
| 8-13-50 2:15 a. m. | 4,006 | 0 | 0 | 87 | | | 60.5 | 12.0 | Trace | | | | |
| 1:10 p. m. | 4,018 | 0 | 0 | | | | | 11.5 | | | | | |
| 4:30 p. m. | | | | 90-100 | | | | 11.5 | | | | | |
| 8:00 p. m.⁵ | 4,068 | 0 | 0 | 120 | 8 gms. | 8 gms. | | 11.5 | | | | 200 | |
| 11:20 p. m. | 4,070 | | | 115 | | | | 12.5 | | | | | |
| 8-14-50 6:00 a. m. | 4,070 | | | 120 | | | | 12.5 | | | | | |

¹ Total solids, 2.8%.
² Total solids, 3.2%.
³ Conc. is tall oil in 28 gr. gas oil; 103 lbs. tall oil per bbl.
⁴ 3 hr. fluid loss, 0 cc.
⁵ 1st drop in 7 hrs. on water loss.

The above fluid was taken to another well and reused without alteration.

The used drilling fluid can be reconditioned by adding sufficient oil and water to restore its original (or any desired) viscosity. Up to 50% or more volume of added liquid may be incorporated without additional chemicals. Or more CMC has been added when it was desired to make up the fluid to a higher viscosity for use in a larger diameter hole (so as better to carry out the cuttings).

Fluid similar to the preceding from another well was run thru a reconditioning plant and 50% volume of a 60-40 oil water mixture containing 1.25 lbs./bbl. of 10-D CMC or 0.16 lb./bbl. on the conditioned fluid basis, was mixed into it. This augmented drilling fluid, showed a water loss of 0 in one hour. This is in marked contrast to drilling muds in general which deteriorate with age and generally cannot be reused.

15 lbs./barrel of tall oil pitch was substituted in the preceding formula for the tall oil. The 30' water loss was 0.8 cc.

In another test the amount of tall oil pitch was increased to 20 lbs./barrel (no tall oil) with the following results:

30' water loss _____ 0.05 cc.
Vis. (700 cc. in 500 out) _____ 38 secs.
pH _____ 12.0

In yet another formulation, a mixture of 7½ lbs./barrel tall oil plus 7½ lbs./barrel tall oil pitch was used, as follows:

30' water loss _____ 0.0 cc. (just starting, clear oil)
Vis. (700 cc. in 500 out) __ 32 secs.
pH _____ 11.5

In still another formulation, there was used, per barrel, 25 lbs. tall oil, 12½ lbs. lime, and 5 lbs. grade 10-D CMC, the latter being first dispersed in the lime solution before incorporation into the oil. This drilling fluid showed:

30' water loss _____ 1.4
Vis. (700 cc. in 500 cc. out) _____ 37 secs.
pH _____ 12.0

The tall oil pitch and tall oil used above had the following analyses:

TALL OIL PITCH

| Softening Point | Minimum | Maximum |
|---|---|---|
| A. S. T. M. ring and ball method | 88 | 108 |
| Acid Number | 60 | 75 |
| Sap. Number | 90 | 110 |
| Rosin acids Number | 45 | 60 |
| Ash, Percent | | 1.0 |
| Fatty acids | 35 | 50 |
| Rosin acids, percent | 24 | 32 |
| Sterols, percent | 22 | 32 |
| Moisture, percent | | 0.2 |
| Red | 10 | 14 |
| Yellow | 24 | 28 |

TALL OIL

| | Minimum | Maximum |
|---|---|---|
| Acid Number | 150 | 160 |
| Sap. Number | 160 | 170 |
| Rosin acids number | 76 | 82 |
| Iodine Number (Wijs) | 150 | 180 |
| Ash | (¹) | (¹) |
| Fatty acids | 45 | 55 |
| Rosin Acids | 40 | 45 |
| Sterols, higher alcohols, etc. | 6 | 10 |

¹ Less than 0.3%.

Such material has been found to greatly reduce the hazards of both water penetration and chemical precipitation in a formation. Thus the fluid will give a clear oil filtrate (if allowed to filter for several hours) of 30 dynes/cm. sq. which consequently can be readily flushed out of a formation by formation oil at a very low pressure. This can be graphically demonstrated by surface tests. For example, oil permeabilities of numerous oilfield cores were obtained, then filtrate from my fluid was forced into them to the extent of more than 1 pore volume of the core, and again permeability measurements were made on the same core. In one series of five tests with filtrate and five with the unfiltered fluid mudded-off on the core at 100 p. s. i., it was found that with a pressure of 1.5 p. s. i., 100% recoverable permeability was recorded.

Water-base muds will not give return permeabilities of such order because of the lack of pressure to flush out the water. On the other hand, oil-base muds contain such materials as the iso-colloids of blown asphalt, etc., whose solubility are critical and if the crude oil of a formation does not have the critical solvent power to maintain them dissolved, precipitation within the formation will result, causing a plugging of the interstices, thus reducing partially or wholly the productivity of the oil-well.

Another harmful feature of straight oil-base fluids is their deterioration by the addition of water. When water is added to an oil base fluid it causes a rise in viscosity and fluid loss properties as determined on a standard A. P. I. filtration cell. In contrast my fluid withstands contamination with water up to 25% without any appreciable change in its properties as follows:

|  | 30 Water loss cc. | Weight (p. c. f.) |
|---|---|---|
| Test #3, The drilling fluid of the first example above | 0.7 | 58.0 |
| Test #15, #3 plus 10% H₂O by vol | 0.4 | 58.5 |
| Test #16, #3 plus 25% H₂O by vol | 0.4 | 59.0 |

It will be appreciated also that conventional weighting material such as those mentioned earlier for example, can be added to my drilling fluid when a heavy mud or fluid is required. The amount added will of course depend upon what the mud engineer requires in view of the particular formation problems.

Yet another advantage of my invention is the ability to withstand the chemical contaminations encountered in drilling which destroy water base fluids. During the drilling of an oil-well, cementing operations will intermittently be required to set tools, casing, etc. and such operations always leave cement in the borehole or casing. Further from time to time it may be desired to drill thru a cement plug which has been previously placed in the well. Such cement when drilled with a water-base mud will cause flocculation of the clay colloids and give rise to increased water loss and viscosity properties. However, the fluid I have developed is not affected by such contamination. Since my fluid is of a lime emulsion type, additions of free lime such as found in cement do not destroy the pH and viscosity of the fluid. Thus additions of free lime, in excess of that needed for proper control of the fluid up to 10 lbs./bbl. gave only a slight increase in filtration properties of the original fluid.

Another feature of my invention is its ability to withstand contamination by sodium chloride. In certain areas beds of sodium chloride are encountered which flocculate water-base muds, increase the water loss and raise the viscosity to such a point that the muds are unpumpable. I have added enough salt to saturate over 22% of the water phase of my fluid without any adverse effect.

|  | 30′ water loss cc. | Gel strength, A. P. I. |
|---|---|---|
| Test #3, No salt | 0.7 | 0 mins. 0, 10 mins. 0. |
| Test #10, 22.2 salt | 0.0 | 0 mins. 0, 10 mins. 0. |

Sat. water phase.

Still another feature of my invention is its ability to prevent dispersion of bentonitic material encountered during drilling. During the drilling of bentonitic shales, chemical mud thinners used in water-base muds cause these shales to disperse to a greater extent than does plain water. In contrast my fluid prevents the hydration and dispersion of bentonitic shales because of the alkaline or lime saturated, water phase of my emulsion fluid. Apparently the dissolved lime brings about a flocculating effect on the surface of a drilled cutting which is sufficient to prevent the shale from dispersing into fine particles. By thus maintaining the bentonitic shale in a large particle-size state it can be taken out of the mud system in the first pass over the shaker screen.

This may be seen from the following tests:

Test #28 (A)—20 lbs./bbl. of dry bentonite was added to drilling fluid and mixed 10 mins. at high speed on a Hamilton Beach mixer, then allowed to remain quiescent 14 hours and then screened through a 16 mesh screen.

30 min. water loss of screened portion
    _____ 0.3 c.c. (filtrate oil)
    pH (hydrion paper)_____ 13.0

Test #(B)—5 lbs./bbl. of lime added and then 20 lbs./bbl. of dry bentonite added. Mixed, aged, and screened as in (A).

30 min. water loss of screened portion
    _____ 0.1 c.c. (filtrate oil)
    pH (hydrion paper)_____ 13.0

Test #(C)—
    30′ water loss original fluid__ 0.0 c.c.

Oil base muds containing water are also troublesome when bentonitic shales are encountered because when the shales hydrate, the viscosity and fluid loss of the mud is increased.

A feature of my invention is its ability to withstand the effect of pressure and temperature. A sample of the preceding fluid was placed in a bomb and then sealed. The sealed bomb was put into an oil bath for 22 hours at temperature of 220° F. The following tests made before and after showed the fluid unchanged.

|  | Before heat | After heat |
|---|---|---|
| 30 min. water loss_____cc__ | 0.3 | 0.3 |
| A. P. I. funnel viscosity_____sec__ | 60 | 60 |
| A. P. I. gel, 0 mins., 10 mins_____ | 0-0 | 0-0 |

While I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalents.

The invention claimed is:

1. A well drilling fluid in the form of a water-in-oil emulsion, said fluid consisting essentially of: a minor proportion of water; a major proportion of a petroleum distillate of low viscosity; a water-soluble emulsifying agent consisting essentially of sodium carboxymethyl cellulose; an oil-soluble emulsifying agent consisting essentially of calcium soaps of rosin acids, and calcium hydroxide in quantity sufficient to bring the hydrogen ion concentration of the aqueous phase of said emulsion within the range pH 10 to pH 14.

2. A well drilling fluid in the form of a water-in-oil emulsion, said emulsion being stabilized by a water-soluble material selected from the class consisting of a sodium salt of carboxymethyl cellulose and a sodium salt of polyacrylic acid produced by the hydrolysis of polymerized acrylo nitrile and an oil-soluble, alkaline earth metal soap of rosin acids, the aqueous phase of said emulsion containing an alkaline earth metal hydroxide in quantity sufficient to bring its hydrogen ion concentration within the range pH 10 to pH 14.

3. A well drilling fluid in the form of a water-in-oil emulsion, said emulsion being stabilized by sodium carboxymethyl cellulose and an oil-soluble calcium soap, the aqueous phase of said emulsion containing calcium hydroxide in quantity sufficient to bring its hydrogen ion concentration to not less than pH 12.

4. The method of producing a water-in-oil emulsion adapted for use as a circulating fluid in rotary well drilling which comprises: separately producing a dilute aqueous solution of sodium carboxymethyl cellulose, a solution in mineral oil of a substance containing a large proportion of rosin acids, and a concentrated aqueous suspension of calcium hydroxide, the quantity of said hydroxide being in material excess of the quantity required to saponify said acids and in an amount to give a hydrogen ion concentration in the range of 10 to 14 to the aqueous phase of the resulting emulsion; strongly agitating said mineral oil solution with said calcium hydroxide suspension until said acids are converted to calcium soaps, and thereafter intimately blending said aqueous solution with the mineral oil containing said soaps.

5. In a process for drilling of an oil or gas well with well drilling tools wherein there is circulated in the well a well drilling fluid, the improvement comprising circulating as a drilling fluid therein a fluid in the form of a water-in-oil emulsion containing a minor proportion of water and a major proportion of a low viscosity petroleum oil, said emulsion being stabilized by sodium carboxymethyl cellulose and an oil-soluble calcium soap, the aqueous phase of said emulsion containing calcium hydroxide in quantities sufficient to bring its hydrogen ion concentration within the range of pH 10 to pH 14.

6. The process of claim 5 wherein the oil-soluble soap is a calcium rosin soap.

7. The process of claim 5 wherein the oil-soluble soap is a calcium tall oil soap.

8. A well drilling fluid in the form of a water-in-oil emulsion, said fluid consisting essentially of: water; an oil of low viscosity; a water soluble emulsifying agent compatible with alkaline earth metal hydroxide in the presence of water selected from the class consisting of a sodium salt of carboxymethyl cellulose and a sodium salt of polyacrylic acid produced by the hydrolysis of polymerized acrylo nitrile; and as an oil-soluble emulsifying agent, an alkaline earth metal soap of acids selected from the group consisting of the water soluble fatty acids and rosin acids and an alkaline earth metal hydroxide in excess of the quantity required to produce said soap and in an amount sufficient to bring the aqueous phase of said emulsion to a pH in excess of 12.

References Cited in the file of this patent
UNITED STATES PATENTS

| Number | Name | Date |
|---|---|---|
| 2,156,333 | Cross et al. | May 2, 1939 |
| 2,360,992 | Weiss | Oct. 24, 1944 |
| 2,488,304 | Malott | Nov. 15, 1949 |
| 2,497,398 | Dawson | Feb. 14, 1950 |
| 2,531,662 | Beck | Nov. 28, 1950 |
| 2,542,019 | Fischer | Feb. 20, 1951 |
| 2,573,959 | Fischer | Nov. 6, 1951 |
| 2,578,888 | Kaveler | Dec. 18, 1951 |
| 2,582,323 | Fischer | Jan. 15, 1952 |